United States Patent
Mao et al.

(10) Patent No.: US 9,100,886 B2
(45) Date of Patent: Aug. 4, 2015

(54) PICO CELL ERROR RECOVERY IN HETNET

(75) Inventors: Jie Mao, Beijing (CN); Zhiping Lei, Beijing (CN); Lei Li, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 177 days.

(21) Appl. No.: 13/263,108

(22) PCT Filed: Nov. 23, 2010

(86) PCT No.: PCT/CN2010/001876
§ 371 (c)(1),
(2), (4) Date: Sep. 11, 2012

(65) Prior Publication Data
US 2013/0017823 A1    Jan. 17, 2013

(51) Int. Cl.
*H04W 36/00* (2009.01)
*H04W 4/00* (2009.01)
*H04B 7/00* (2006.01)
*H04J 14/02* (2006.01)
*H04J 1/16* (2006.01)
*H04W 36/04* (2009.01)
*H04W 36/16* (2009.01)

(52) U.S. Cl.
CPC .............. *H04W 36/04* (2013.01); *H04W 36/16* (2013.01)

(58) Field of Classification Search
CPC .............................. H04W 36/04; H04W 36/16
USPC .............. 455/424, 422.1, 509, 507, 436, 418, 455/426.1; 378/103; 370/338, 315, 216, 370/328, 242, 331; 398/96, 79
See application file for complete search history.

(56) References Cited

U.S. PATENT DOCUMENTS

| | | | |
|---|---|---|---|
| 5,230,082 A * | 7/1993 | Ghisler et al. | 455/438 |
| 6,839,344 B1 * | 1/2005 | Couillaud et al. | 370/353 |
| 2007/0047483 A1 * | 3/2007 | Khan | 370/328 |
| 2007/0190996 A1 | 8/2007 | Asthana et al. | |
| 2008/0145056 A1 * | 6/2008 | Boldi et al. | 398/96 |
| 2009/0257361 A1 * | 10/2009 | Deshpande et al. | 370/252 |

(Continued)

FOREIGN PATENT DOCUMENTS

| | | |
|---|---|---|
| EP | 0 347 396 | 12/1989 |
| EP | 0 471 656 | 2/1992 |

(Continued)

OTHER PUBLICATIONS

Siemens, Radio Head/Radio Server Portfolio, "Macro Coverage and Capacity in Micro packages", pp. 1-4, 2006.*
EPO Extended Search Report for Application No./Patent No. 11158578.2-1857/ 2456260; Reference: P32485EP1, Feb. 20, 2014.

*Primary Examiner* — Opiribo Georgewill
(74) *Attorney, Agent, or Firm* — Baker Botts, LLP

(57) ABSTRACT

A method is provided for performing handover of at least a first User Equipment from a first cell to a second cell in case of failure of the first cell.
The first cell is controlled by a first Remote Radio Unit connected to a Main unit, and the second cell is controlled by a second Remote Radio Unit connected to the Main Unit, and the second cell has the same or a larger coverage area as the first cell. The method comprises the steps of monitoring the state of the connection between the first Remote Radio Unit and the Main Unit, and sending handover information to the User Equipment through the second cell using resources assigned for control signalling in said first cell, if the state of the connection between said first Remote Radio Unit and said Main Unit indicates that said first Remote Radio Unit has ceased to be functional

14 Claims, 5 Drawing Sheets

(56) References Cited

U.S. PATENT DOCUMENTS

2010/0159991 A1 6/2010 Fu et al.
2011/0317544 A1* 12/2011 Chou ............................ 370/216

FOREIGN PATENT DOCUMENTS

| WO | WO 03/047130 | 6/2003 |
| WO | WO 2010/077002 | 7/2010 |

* cited by examiner

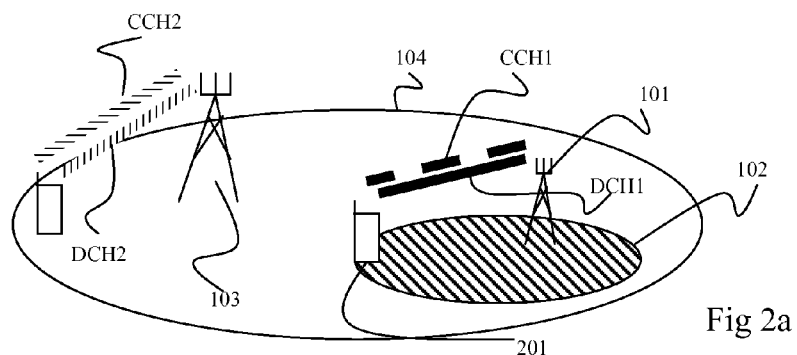
Fig 2a
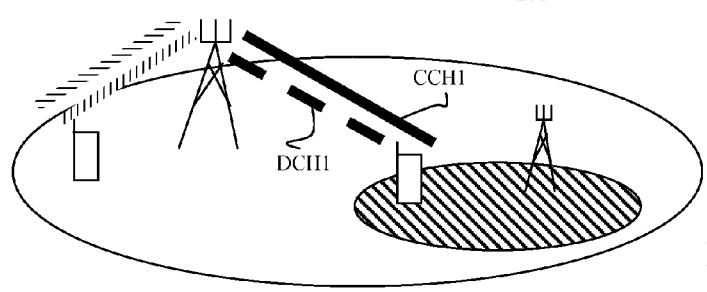
Fig 2b
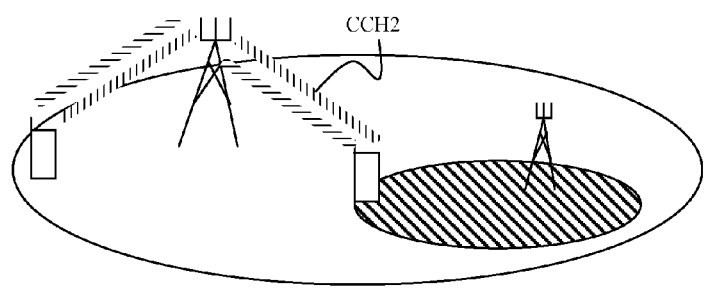
Fig 2c
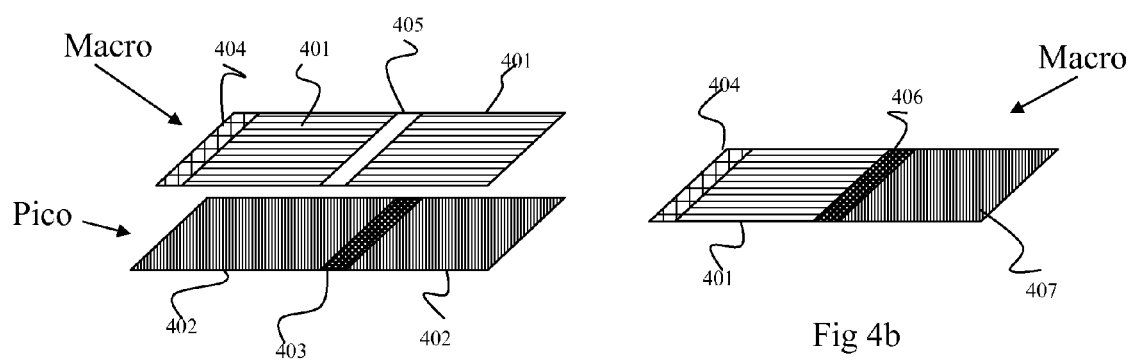
Fig 4a
Fig 4b

PICO CELL ERROR RECOVERY IN HETNET

This application is the U.S. national phase of International Application No. PCT/CN2010/001876 filed 23 Nov. 2010 which designated the U.S., the entire contents of which is hereby incorporated by reference.

TECHNICAL FIELD

The present invention relates to the field of radio telecommunications. More specifically, the present invention relates to a handover procedure in heterogeneous network architecture in case of cell failure.

BACKGROUND OF THE INVENTION

The present invention finds application particularly in third-generation radio networks such as Wideband Code division Multiple Access (WCDMA) or Long Term Evolution (LTE) type of networks. However, the techniques may be applicable also in connection with other types of radio networks, such as GSM, CDMA etc, and in general in any type of network employing a layered cell structure.

In most Heterogeneous Network (HetNet) scenarios using a layered cell structure, one or more low power nodes, such as Pico cells, are placed throughout a macro-cell layout to increase capacity in hotspots.

A Base Band Unit (BBU) pool is a good solution to realize a layered HetNet architecture. Employing a BBU pool, all baseband processing of a geographical area are centralized into one remote Main Unit (MU), e.g. in the Radio Network Control (RNC) office. Remote Radio Units (RRU) are installed near to antennas and connected directly to the MU by Optical Interface Link (OIL) cables to transport IQ data to the MU. IQ data represents the phase and amplitude of a signal received by the RRU. RRUs can have high output power to create Macro cells or utilizing lower power to create Pico cells, depending on the capacity requirement in the area. Macro cells are cells utilizing a higher output power and are thus covering a larger geographical area, whereas Pico cells are using lower output power and are thus covering smaller geographical areas, most commonly at hotspots with intense traffic. IQ data from all kinds of RRUs are processed in the centralized MU.

FIG. 1 shows the architecture of BBU pool HetNet, where the centralized BBU in the MU processes baseband signals for all the RRUs connected to it. Baseband processing in a centralized BBU also include, among many other things:

Control channel signalling generation for each RRU cell
UE information management for each RRU
UE scheduling for each RRU cell
Joint radio resource coordination among RRUs Pico RRU has the advantage of being small, flexible and easy to install, as well as providing an economic solution for increasing capacity. However, the power supply systems, especially big and expensive backup batteries usually restrict the installation convenience and reduces the advantages of Pico RRUs. Backup batteries often require a suitable place to be installed providing the right temperature and humidity, thus restricting the flexibility of Pico cell site selection.

In many implementations, in order to reduce cost and footprint, small volume backup batteries are chosen. The small volume backup batteries only provide a few minutes of power to be able to handover traffic to other cells without dropping calls. The connected calls will drop if there is no battery backup.

Consequently, to improve cell site selection flexibility for pico cells, and to be able to reduce Capital expenditure (CAPEX) and Operational expenditure (OPEX) of Pico cells, there is need for a fault tolerance solution without battery backup system.

SUMMARY OF THE INVENTION

Therefore, there is a need of fast error detection solution and emergency treatment when a layered remote radio unit fails.

It is an object of at least certain embodiments to provide a method for performing handover of at least a first User Equipment from a first cell to a second cell in case of failure of the first cell.

According to one embodiment the first cell is controlled by a first Remote Radio Unit connected to a Main unit, and the second cell is controlled by a second Remote Radio Unit connected to the Main Unit, and the second cell has the same or a larger coverage area as the first cell.

The method comprises the steps of monitoring the state of the connection between the first Remote Radio Unit and the Main Unit, and sending handover information to the User Equipment through the second cell using resources assigned for control signalling in said first cell, if the state of the connection between said first Remote Radio Unit and said Main Unit indicates that said first Remote Radio Unit has ceased to be functional.

In other words according to at least one embodiment, a main unit monitors a link to a first remote radio unit. If the status of the link indicates that the remote radio unit has failed, for instance through power failure, the Main Unit initiates a fast handover process to a macro cell covering at least partly the same geographical area as the cell associated with the first remote radio unit for the user equipment currently served by the cell associated with the first remote radio unit.

This is possible since the Main Unit has information about physical resource block allocation regarding for instance the control channel for the first remote radio unit, as well as data relating to the user equipment currently served by the cell associated with the first radio remote unit.

It is thus possible for the Main Unit to set up the second remote radio unit, so that it imitates the first remote radio unit and can instruct the user equipment to perform a handover to the second cell. The user equipment will perceive that the control signalling and the handover order is transmitted from the first remote radio unit, since the second remote radio unit uses the same physical resource blocks, identities etc for signalling as was used by the first remote radio unit before failure.

By the provisions of at least some of the above disclosed embodiments it is possible to refrain from providing selected remote radio units with back-up power, for instance in the form of back-up batteries. This provide the possibility for a more flexible site selection, better OPEX and CAPEX as well as a smaller footprint for those remote radio units.

According to another aspect, some embodiments relates to a radio base station having a main unit connected to a first remote radio unit controlling a first cell, and connected to a second remote radio unit controlling a second cell, where the second cell has the same or a larger coverage area as the first cell, and where the main unit is provided with a processing unit adapted to monitor the state of the connection between the first Remote Radio Unit and the Main Unit.

The processing unit is further adapted to send handover information to said User Equipment through said second cell using resources assigned for control signalling in said first cell, if the state of the connection between said first Remote Radio Unit and said Main Unit indicates that said first Remote Radio Unit has ceased to be functional.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 7, which are given by way of illustration only, and thus are not limitative of the present invention.

FIG. 2 is a schematic diagram according to one embodiment showing connection status and resource allocation;

FIG. 4 is a schematic diagram showing physical resource allocation according to one embodiment;

DETAILED DESCRIPTION OF DIFFERENT ASPECTS OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
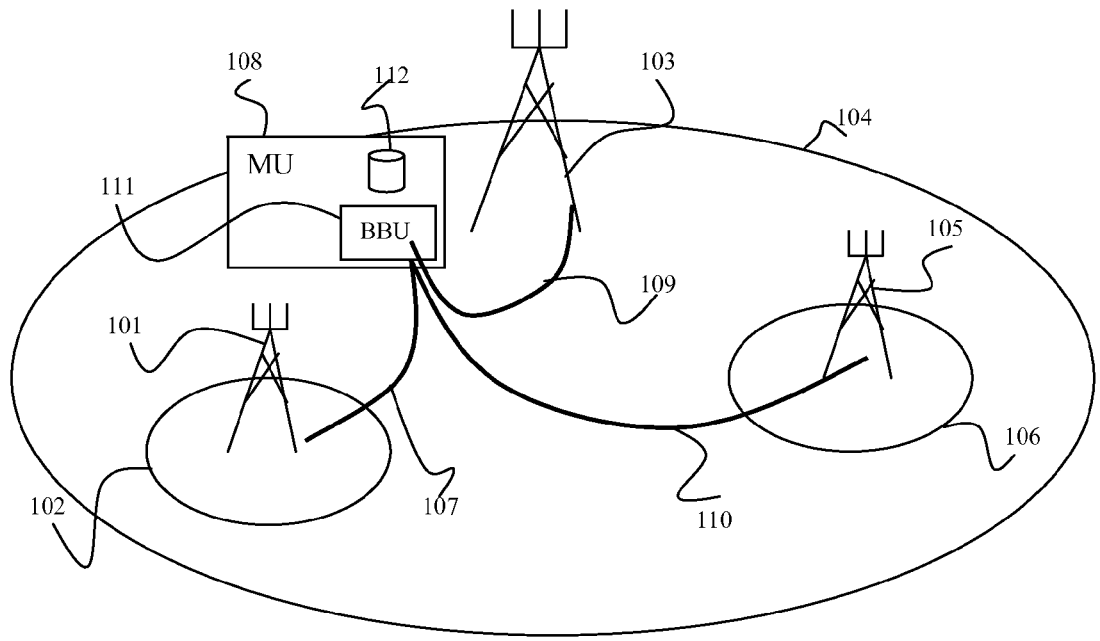
FIG. 1 is a schematic diagram according to one embodiment showing a layered heterogeneous network configuration.

FIG. 1 is a schematic diagram showing a layered heterogeneous network comprising a first remote radio unit 101 having a pico cell 102 and a second remote radio unit 103 having a macro cell 104. The diagram also comprises a third remote radio unit 105 having a pico cell 106. It should be made perfectly clear that the network may comprise many more pico and macro cells as well as many other nodes and connections, which are not shown for clarity. As can be seen in FIG. 1 the macro cell covers a geographical area which includes the geographical area of the two pico cells. Thus FIG. 1 discloses a layered network architecture.

The first remote radio unit 101 is connected through an optical connection 107 to a main unit 108. The main unit 108 is further connected to the second and third remote radio units 103 and 105, respectively by further connections 109 and 110. It should be noted that the connections may be other types of connections and is not limited to the optical variant.

The main unit 108 comprises a Base Band Unit Processing pool 109 provided to do Base band processing for the three remote radio units 101, 103 and 105, respectively. Thus, each of the remote radio units transmits IQ data, that is amplitude and phase information for the signals received at the remote radio unit, to the main unit, which assigns resources from the base band unit pool 111 for processing of the received IQ data. The main unit 108 in turn, using the assigned base band units, transmits IQ data to each respective remote radio unit for radio transmission in respective associated cell 102, 104 and 106. Thus, different signals are sent to each remote radio unit for further transmission to user equipments in respective cells.

FIGS. 2a to 2c are schematic block diagrams showing the main events of one embodiment of the invention. In FIG. 2a a first user equipment 201 is connected, using a first control channel CCH1, to a first remote radio unit having a first cell 102. The first cell is a pico cell serving a relatively small geographical area, at least smaller than the second cell 104, served by the second remote radio unit 103.

A second user equipment 202 is connected to the second remote radio unit using a second control channel CCH2. The first user equipment 201 is connected to the first remote radio unit using a first control channel CCH1 and a data channel DCH1.

FIG. 4a is a schematic block diagram of a physical radio resource block allocation for the heterogeneous layered network in FIGS. 1 and 2, for the first and second cell 102 and 104.

The Macro block at the top of FIG. 4a is the physical resource allocation for the second cell 104, which is the macro cell and the Pico block at the lower part of FIG. 4a is the physical resource allocation for the first cell 102, which is the pico cell.

The Macro and Pico data resource allocation are managed by the Inter-Cell Interference Coordination (ICIC), so the interference between Macro and Pico data are controlled. ICIC is a radio resource management technique to lower inter-cell interference by coordinating the reuse of spectrum resources, so called physical resource blocks (PRBs), among overlapping or neighboring cells. For control channels, Pico and Macro cells use orthogonal channels to avoid interference.

The first control channel CCH1 is allocated to first physical radio resource blocks 403, and the second control channel CCH2 is allocated to second physical radio resource blocks 404 as is indicated in FIG. 4a. Note that the resource block 405 in the Macro cell is left unused, so as not to disturb the control channel in the Pico cell. The radio resource blocks 401 and 402, used for data traffic, are not necessarily orthogonal to each other. Since data channels has lower priority than control channels ICIC can be used to control the interference between data channels.

If, as is indicated in FIG. 2b, the first remote radio unit for some reason, for instance power failure, cease to operate, the main unit 108 will detect the failure by monitoring the link to the first remote radio unit. The main unit 108, will then assign the physical resource blocks 403 to the second remote radio unit 103, as is indicated in FIG. 4b and FIG. 2b. Thus, the first control channel will be allocated to the resource block 406 in FIG. 4b in the macro cell. The user equipment will continue to use the same signaling resources as before the first remote radio unit failed, but will send and receive data to and from the second remote radio unit instead.

The second remote radio unit will finally order the user equipment to do a handover to the second cell as disclosed in FIG. 2c.

Thus, the resources assigned for control signalling in said first cell are first physical resource blocks which are orthogonal to second physical resource blocks, where the second physical resource block are used for control signalling for the second cell.

Figure 3:
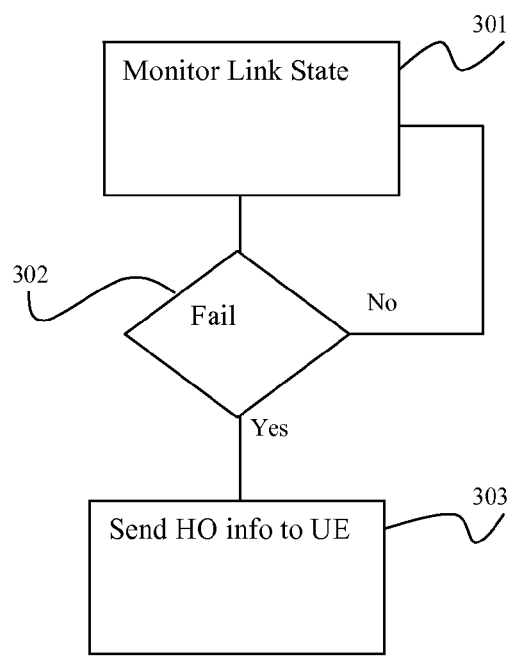
FIG. 3 is a schematic flow diagram according to one embodiment.

FIG. 3 is a schematic flow diagram of the process disclosed above, wherein the main unit 108 in a first step 301 monitors the link status to the remote radio units. If a link fails 302 to the first remote radio unit, the main unit 308 will send handover orders to the affected user equipments located in the first cell served by the first remote radio unit, by allocating control resources previously allocated to the failed first remote radio unit, step 303, to a second remote radio unit serving a second cell.

The state of the connection between said first remote radio unit and the main unit is monitored in the main unit by detecting end of reception of IQ data from the first Remote Radio Unit. According to one embodiment the state can for instance be regarded as changed if the main unit does not receive IQ data for a specified time.

According to one embodiment, handover information is provided for enabling handover of the User Equipment from the first cell to said second cell.

According to one embodiment the main unit identifies first physical resource blocks used for control signalling in the first cell, and data associated with the User Equipment in the first cell served by first Remote Radio Unit.

According to one embodiment the main unit comprises a database storing data regarding the physical resource blocks used by different remote radio units, data regarding user equipment present in different cells served by remote radio units being connected to the main unit as well as other data pertinent to the operation of the main unit.

According to one embodiment the main unit sets up the control channel allocated to the first cell, using the first physical resource block, in the second cell for use by the second Remote Radio Unit for sending control signalling to user equipment in the first cell.

According to one embodiment the main unit sends a Radio Resource Control Connection Reconfiguration Request using the Control Channel carried by the first physical resource block, through the second Remote Radio Unit.

Figure 5:
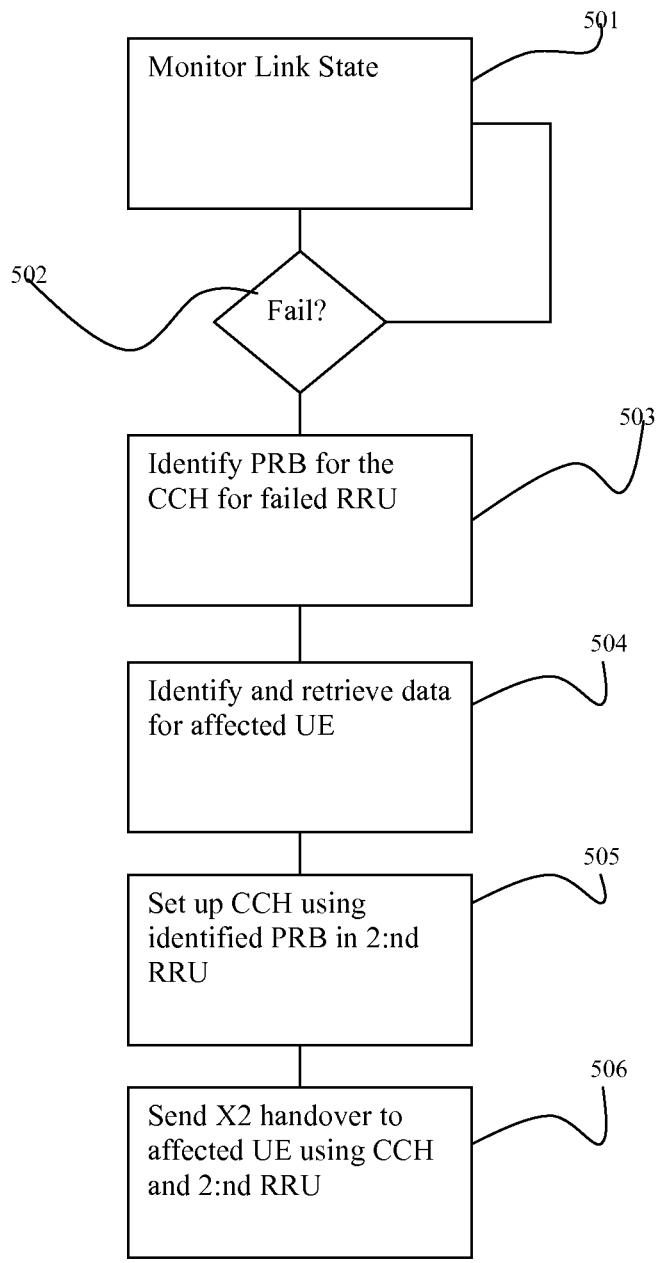
FIG. 5 is a schematic flow diagram according to one embodiment.

According to further embodiments the connection between the Remote Radio Units and the Main Unit is using the Common Public Radio Interface (CPRI) protocol FIG. 5 is a schematic flow diagram according to a further embodiment of the invention. In a step 501, the main unit monitors the link status to the remote radio units. If a link fails 502, the main unit 108 identifies 503 the physical resource blocks for the control channels for the failing remote radio unit. The main unit may do this be keeping a list of the physical radio resources used by the different remote radio units as well as the link identity for that remote radio unit.

The main unit 108 further identifies 504 data associated with the affected user equipments, that is, the user equipments currently being served by the failing remote radio unit. The main unit keeps track of which user equipments are served by respective remote radio unit as part of the regular operation of the main unit 108. The main unit 108 sets up the control channels using the physical resources identified. The control channels are set up in the macro cell, served by the second remote radio unit, which is still operational. Finally, the main unit sends a radio resource connection reconfiguration request using the control channels set up in the macro cell. Also, a location update is sent to higher layers.

Figure 6:
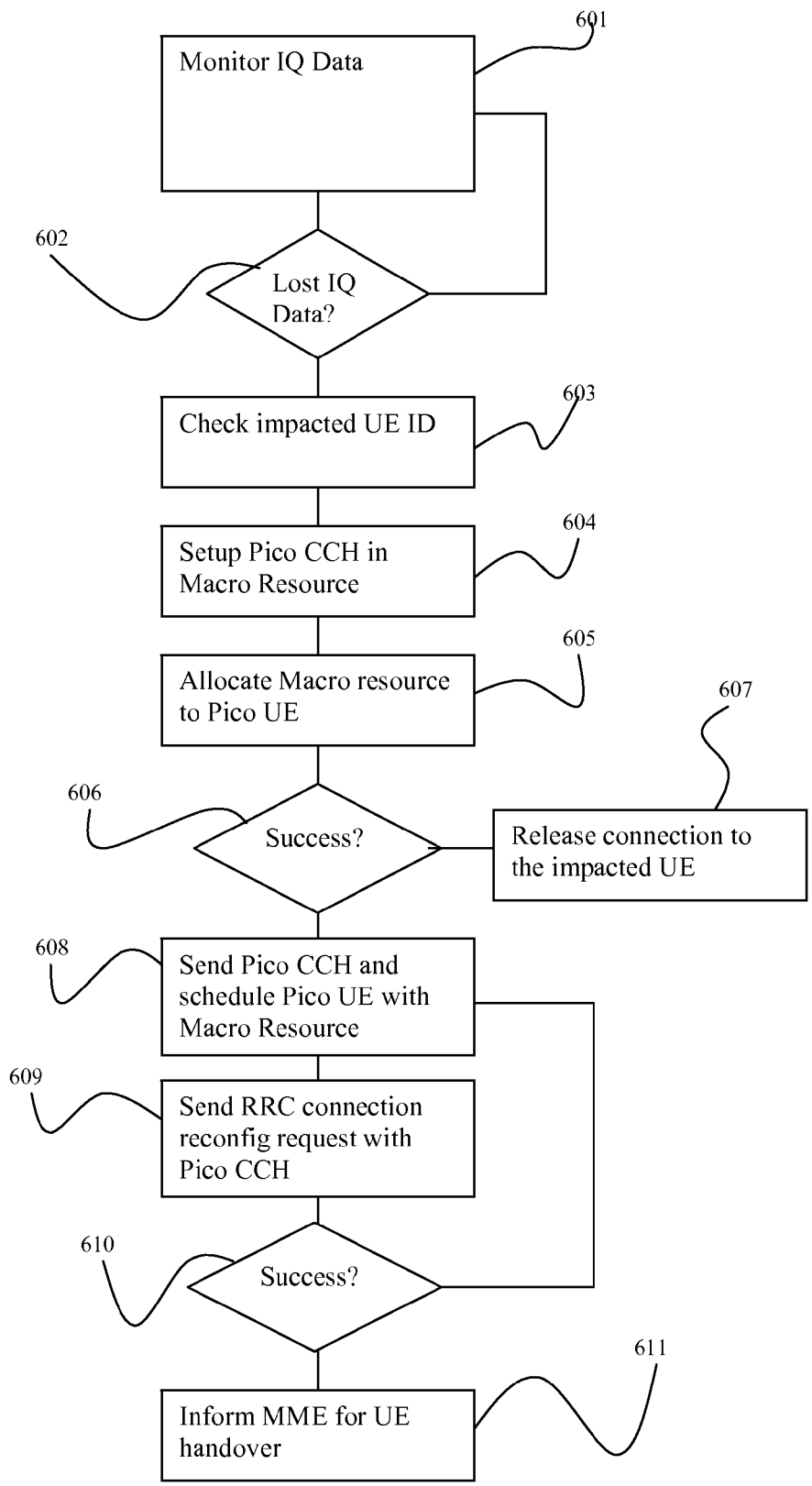
FIG. 6 is a schematic flow diagram according to one embodiment.

FIG. 6 is a schematic flow diagram according to one embodiment. In step 601 the main unit 108 monitor receptions of IQ data from first, second and third remote radio units 101, 103 and 105. Obviously the network may comprise several more remote radio units, although only three are disclosed here.

In step 602 the main unit 108 detects loss of IQ data from one link and checks and identifies impacted user equipments in step 603. Since a data base 112 in the main unit 108 keeps user equipment information for user equipments attached to each remote radio units hosted by the main unit 108, the main unit 108 has access to data to identify impacted user equipments.

In step 604 the main unit 108 sets up the Control Channel (CCH) used in the pico cell, on the resources used for the macro cell, and in step 605 the main unit 108 allocates physical macro resources to the user equipment.

If, step 606, the resource allocation is not successful the connection to the user equipment is released, step 607. If the resource allocation is successful, the main unit sends pico CCH and schedules the user equipment using macro resource, step 608. The scheduled macro resources are used to receive and transmit data to the user equipment that would have been sent and received using the pico cell if it had been operational until the handover to the macro cell is complete.

In step 609 the main unit sends a RRC connection reconfiguration request using the pico CCH to order the user equipment to do a handover. It should be noted that the handover is not necessarily to the macro cell but can be towards another close pico cell. If, step 610, the handover is successful, the Mobility Management Entity (MME) is informed in step 611.

Thus, the main unit uses data stored in the main unit relating to the control channels of the pico cell, and the user equipment served by the pico cell, to quickly mimic the pico cell if it fails, using resources in the macro cell. Thus, user equipment served by the pico cell will not notice the failure of the pico cell.

Figure 7:
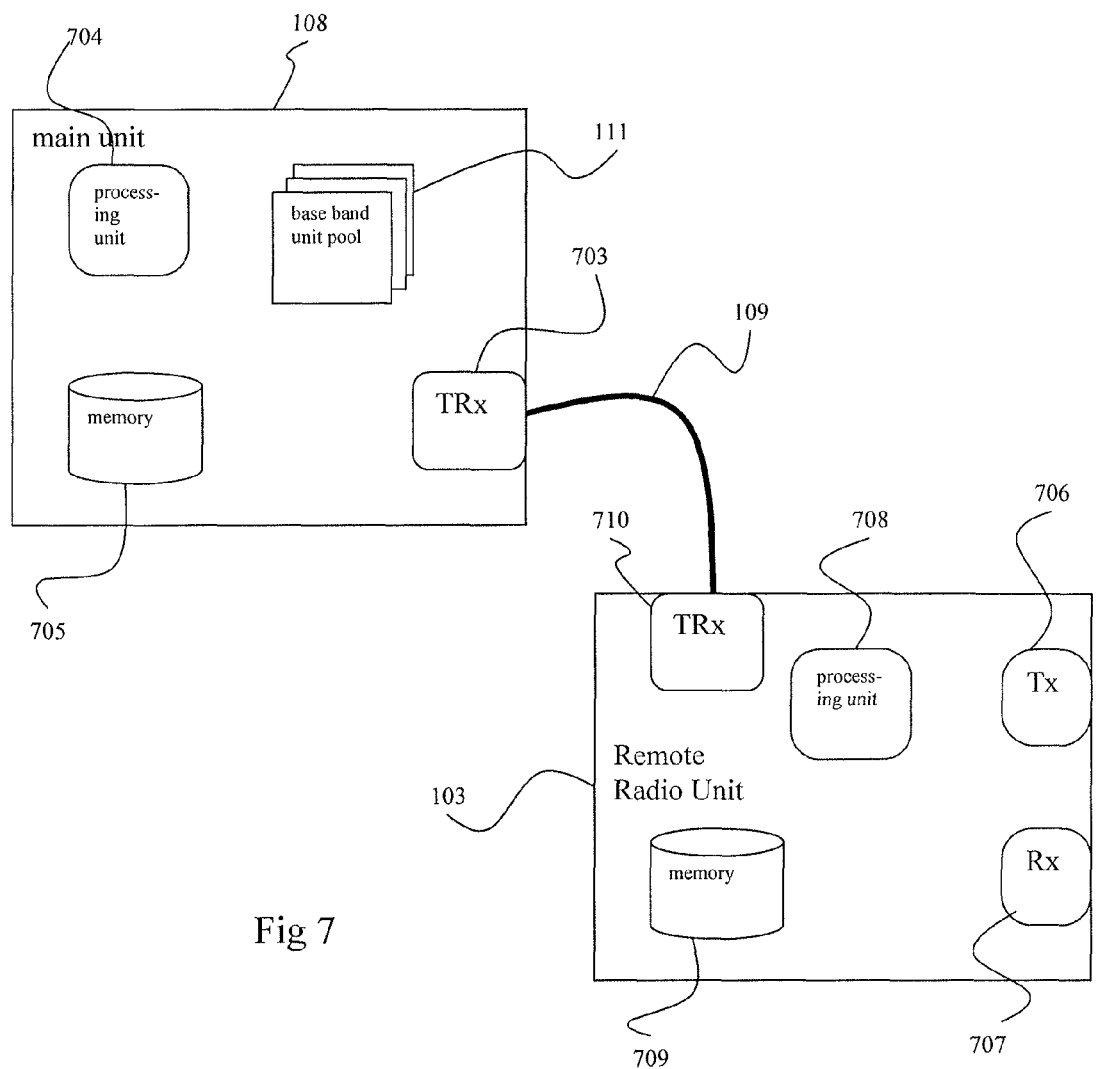
FIG. 7 is a schematic block diagram detailing some components of the main unit and a remote radio unit according to one embodiment.

FIG. 7 is a schematic block diagram of a radio base station comprising a main unit 108 and a remote radio unit 103 connected with a optical link 109. The main unit 108 is provided with a transceiver 703 for sending and receiving IQ data over the optical link 109 to and from the remote radio unit 103. It should be made clear that the main unit may be connected to a plurality of remote radio units in a similar fashion, even though only one is shown in FIG. 7. The main unit is further provided with a base band unit pool 111 and a processing unit 704 connected to a memory 705. The processing unit 704 can be implemented using a conventional central processing unit, a custom made ASIC, FPGA or similar. The processing unit 704 is provided to control the memory 705, transceiver 703 and base band pool 111, as well as other components conventionally present, to achieve the tasks and processes associated with the main unit 108 disclosed in the present disclosure.

The remote radio unit 103 is also provided with a transceiver 710 for sending and receiving IQ data to and from the main unit 108, as well as a transmitter 706 for sending radio signals to user equipments, and a receiver 707 for receiving radio signals from user equipments. The remote radio unit 103 is further provided with a processing unit 708 connected to a memory 709. The processing unit 708 can be implemented using a conventional central processing unit, a custom made ASIC, FPGA or similar. The processing unit 708 is provided to control the memory 709, transceiver 710, receiver 707 and transmitter 706, as well as other components conventionally present, to achieve the tasks and processes associated with the remote radio unit 103 disclosed in the present disclosure.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method for performing handover of at least a first User Equipment from a first cell to a second cell, wherein
the first cell comprises a pico cell and is controlled by a first Remote Radio Unit connected via a first connection to a Main unit, the first Remote Radio unit serving the first User Equipment via a first wireless link,
the second cell comprises a macro cell and is controlled by a second Remote Radio Unit connected via a second connection to said Main Unit, the second Remote Radio unit configured to serve the first User Equipment via a second wireless link,
the first Remote Radio unit and the second Remote radio unit forming a distributed base station together with the Main unit,
the second cell having a coverage area that includes the first cell, characterised in,
monitoring, by the main unit, the state of the first connection between said first Remote Radio Unit and said Main Unit,
sending handover information to said User Equipment through said second cell using resources assigned for control signalling in said first cell, if the state of the first connection between said first Remote Radio Unit and said Main Unit indicates that said first Remote Radio Unit has ceased to be functional;
prior to the first connection between said first Remote Radio Unit and said Main Unit of the pico cell ceasing to be functional, a resource block allocated to the macro cell is unused so as not to disturb an orthogonal resource block allocated to the pico cell; and
after the first connection between said first Remote Radio Unit and said Main Unit of the pico cell ceases to be functional, the resource block that was unused is allocated to transmit control channel information to the first User Equipment that was served by the second Remote Radio Unit of the pico cell.

2. The method according to claim 1, wherein
the resources assigned for control signalling in said first cell are first physical resource blocks orthogonal to second physical resource blocks, where the second physical resource block are used for control signalling for the second cell.

3. The method according to claim 1, wherein
said handover information are provided for enabling handover of said at least first User Equipment from said first cell to said second cell.

4. The method according to claim 1, wherein
the Main Unit comprises a Base Band Unit pool provided to perform Base Band operations for a plurality of Remote Radio Units including the first and second Remote Radio Unit.

5. The method according to claim 1, wherein
the state of the first connection between said first Remote Radio Unit and said Main Unit is monitored in said Main Unit by detecting end of reception of IQ data from said first Remote Radio Unit.

6. The method according to claim 1, comprising the steps of:
identifying the first physical resource blocks used for control signalling by said first cell,
identifying data associated with the User Equipment served by said first Remote Radio Unit,
setting up the first cell control channel to said user equipment using the first physical resource block for transmission by said second Remote Radio Unit in said second cell,
sending a Radio Resource Control Connection Reconfiguration Request using the first cell Control Channel carried by the first physical resource block, through the second Remote Radio Unit.

7. The method according to claim 1, wherein
the first connection between the Remote Radio Unit and the Main Unit is using a CPRI protocol.

8. A radio base station having a main unit connected via a first connection to a first remote radio unit serving a first cell, and connected via a second connection to a second remote radio unit controlling a second cell, where the first cell comprises a pico cell and the second cell comprises a macro cell having a coverage area that includes the first cell, and where the main unit is provided with a processing unit adapted to
monitor the state of the first connection between at least the first Remote Radio Unit and the Main Unit,
send handover information to said User Equipment through said second cell using resources assigned for control signalling in said first cell, if the state of the first connection between said first Remote Radio Unit and said Main Unit indicates that said first Remote Radio Unit has ceased to be functional,
prior to the first connection between said first Remote Radio Unit and said Main Unit of the pico cell ceasing to be functional, a resource block allocated to the macro cell is unused so as not to disturb an orthogonal resource block allocated to the pico cell; and
after the first connection between said first Remote Radio Unit and said Main Unit of the pico cell ceases to be functional, the resource block that was unused is allocated to transmit control channel information to the first User Equipment that was served by the second Remote Radio Unit of the pico cell, and
wherein the first remote radio unit serves the User Equipment via a first wireless link, the second remote radio unit serves the first User Equipment via a second wireless link, the first remote radio unit and the second remote radio unit form a distributed base station together with the Main Unit of the radio base station.

9. The radio base station according to claim 8, wherein
the resources assigned for control signalling in said first cell are first physical resource blocks orthogonal to second physical resource blocks, where the second physical resource block are used for control signalling for the second cell.

10. The radio base station according to claim 8, wherein
said handover information are provided for enabling handover of said at least first User Equipment from said first cell to said second cell.

11. The radio base station according to claim 8, wherein
the Main Unit comprises a Base Band Unit pool provided to perform Base Band operations for a plurality of Remote Radio Units including the first and second Remote Radio Unit.

12. The radio base station according to claim 8, wherein
the state of the first connection between said first Remote Radio Unit and said Main Unit is monitored in said Main Unit by detecting end of reception of IQ data from said first Remote Radio Unit.

13. The radio base station according to claim 8, wherein the processing unit is further adapted to
identify the first physical resource blocks used for control signalling by said first cell,
identify data associated with the User Equipment served by said first Remote Radio Unit, set up the first cell control channel to said user equipment using the first physical resource block for transmission by said second Remote Radio Unit in said second cell, send a Radio Resource Control Connection Reconfiguration Request using the first cell Control Channel carried by the first physical resource block, through the second Remote Radio Unit.

14. The radio base station according to claim 8, wherein the first connection between the Remote Radio Unit and the Main Unit is using a CPRI protocol.

* * * * *